(12) United States Patent
Cai et al.

(10) Patent No.: US 11,109,209 B2
(45) Date of Patent: Aug. 31, 2021

(54) BLUETOOTH DEVICE, METHOD OF OPERATING BLUETOOTH DEVICE, AND NON-TRANSITORY COMPUTER READABLE STORAGE MEDIUM

(71) Applicant: Realtek Semiconductor Corporation, Hsinchu (TW)

(72) Inventors: Cheng Cai, Suzhou (CN); Wei-Dong Li, Suzhou (CN); Ma Zhang, Suzhou (CN); Yong Liu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 17 days.

(21) Appl. No.: 16/787,209

(22) Filed: Feb. 11, 2020

(65) Prior Publication Data

US 2020/0382932 A1 Dec. 3, 2020

(30) Foreign Application Priority Data

May 28, 2019 (CN) .......................... 201910451243.X

(51) Int. Cl.
*H04W 4/80* (2018.01)
*H04W 84/18* (2009.01)
(Continued)

(52) U.S. Cl.
CPC .............. *H04W 4/80* (2018.02); *H04W 8/005* (2013.01); *H04W 28/0278* (2013.01); *H04W 76/14* (2018.02); *H04W 84/18* (2013.01)

(58) Field of Classification Search
CPC .......... H04M 1/72412; H04M 2250/02; H04B 5/00; H04B 5/02; H04W 76/10; H04W 88/06; H04W 84/18; H04W 4/80; H04W 76/14; H04W 28/0278; H04W 8/005; H04W 4/50; H04L 65/602; H04L 65/80;
(Continued)

(56) References Cited

U.S. PATENT DOCUMENTS 6,067,072 A * 5/2000 Fujishita ................ G11B 31/00
715/727
6,816,491 B1 * 11/2004 Fujii ................ H04N 21/42692
370/394
(Continued)

OTHER PUBLICATIONS

Chase, R.. Microcontroller based handheld acoustic communication & power delivery through metallic barriers, 2013, (Order No. 1547915). ProQuest Dissertations and Theses Professional. (1465433727). https://dialog.proquest.com/professional/docview/1465433727?accountid=13144 (Year: 2013).*

*Primary Examiner* — Lana N Le
(74) *Attorney, Agent, or Firm* — Locke Lord LLP; Tim Tingkang Xia, Esq.

(57) ABSTRACT

A Bluetooth device and a method of operating the Bluetooth device are provided. The Bluetooth device includes a communication circuit and a processor coupled to the communication circuit. The communication circuit is configured to receive a setting data through a control channel. The processor is configured to alter, by the setting data, at least one of executing parameters to modify operating environments, and the processor is further configured to perform operations of Bluetooth communications according to the operating environments which have been modified.

18 Claims, 3 Drawing Sheets

(51) Int. Cl.
*H04W 76/14* (2018.01)
*H04W 28/02* (2009.01)
*H04W 8/00* (2009.01)

(58) Field of Classification Search
CPC .......... H04L 12/4633; H04N 21/43637; H04N 21/4852; H04N 21/4392
USPC ................................................ 455/41.1, 41.2
See application file for complete search history.

(56) References Cited

U.S. PATENT DOCUMENTS

| | | | | |
|---|---|---|---|---|
| 10,284,703 | B1* | 5/2019 | Lawrence | H04L 5/14 |
| 10,784,993 | B1* | 9/2020 | Batra | H04L 1/1887 |
| 2004/0045030 | A1* | 3/2004 | Reynolds | H04L 65/604 |
| | | | | 375/E7.012 |
| 2007/0178937 | A1* | 8/2007 | Walters | H04W 8/22 |
| | | | | 455/558 |
| 2008/0144501 | A1* | 6/2008 | Nagy | H04W 28/22 |
| | | | | 455/41.2 |
| 2009/0176454 | A1* | 7/2009 | Chen | H04W 16/14 |
| | | | | 455/63.1 |
| 2011/0059723 | A1* | 3/2011 | Oguchi | H04W 8/005 |
| | | | | 455/410 |
| 2012/0244811 | A1* | 9/2012 | Chen | H04L 65/602 |
| | | | | 455/41.2 |
| 2014/0082146 | A1* | 3/2014 | Bao | H04N 21/44004 |
| | | | | 709/219 |
| 2015/0103708 | A1* | 4/2015 | Kang | H04W 52/0235 |
| | | | | 370/311 |
| 2017/0295284 | A1* | 10/2017 | Song | H04L 65/1069 |
| 2018/0091929 | A1* | 3/2018 | Bi | H04W 72/1257 |
| 2018/0098277 | A1 | 4/2018 | Brageul | |
| 2018/0167665 | A1* | 6/2018 | Jang | H04N 21/8106 |
| 2018/0324829 | A1* | 11/2018 | Van Driest | H04W 72/1215 |
| 2019/0172047 | A1* | 6/2019 | Tan | G06Q 20/3263 |
| 2019/0373490 | A1* | 12/2019 | Rahmati | H04L 65/602 |
| 2020/0260255 | A1* | 8/2020 | Jamadagni | H04W 4/70 |
| | | | | 455/41.2 |
| 2020/0396517 | A1* | 12/2020 | Hodge | H04N 21/47217 |

* cited by examiner

BLUETOOTH DEVICE, METHOD OF OPERATING BLUETOOTH DEVICE, AND NON-TRANSITORY COMPUTER READABLE STORAGE MEDIUM

CROSS-REFERENCE TO RELATED APPLICATION

This application claims priority to and the benefit of Chinese patent application No. 201910451243.X, filed on May 28, 2019, the entire content of which is incorporated herein by reference as if fully set forth below in its entirety and for all applicable purposes.

BACKGROUND

Technical Field

The disclosure generally relates to electronic devices and methods, and more particularly, to Bluetooth devices and methods of operating Bluetooth devices.

Description of Related Art

Advanced Audio Distribution Profile (A2DP) is a standard that defines audio transmissions in Bluetooth communication technology. In A2DP, there are latencies caused while audio data is transmitted/received between Bluetooth devices, and such latencies are resulted from the hardware/software of the Bluetooth devices. Accordingly, it is desirable to have a solution for reducing the latencies between Bluetooth devices in transmission/reception procedures.

SUMMARY

One aspect directed towards a Bluetooth device is disclosed. The Bluetooth device includes a communication circuit and a processor. The communication circuit is configured to receive a setting data through a control channel. The processor, coupled to the communication circuit, is configured to alter at least one of executing parameters by the setting data to modify operating environments. The processor is further configured to perform operations of Bluetooth communications according to the operating environments which have been modified.

One aspect directed towards a method of operating Bluetooth device is disclosed. The method of operating Bluetooth device includes the following steps: receiving, through a control channel of the communication circuit, a setting data; altering, by the processor, at least one of executing parameters by the setting data to modify operating environments; and performing, by the processor, operations of Bluetooth communications according to the operating environments modified by the at least one of executing parameters which have been altered.

In a further aspect of the disclosure, a computer readable medium storing a computer executable codes is disclosed, which includes instructions for causing a processor to perform various steps. The steps include to receive, through a control channel of a communication circuit, a setting data; alter at least one of executing parameters by the setting data; and perform, according to operating environments modified by the at least one of executing parameters which have been altered, operations of Bluetooth communications.

It is to be understood that both the foregoing general description and the following detailed description are by examples, and are intended to provide further explanation of the invention as claimed.

DETAILED DESCRIPTION

Figure 1:
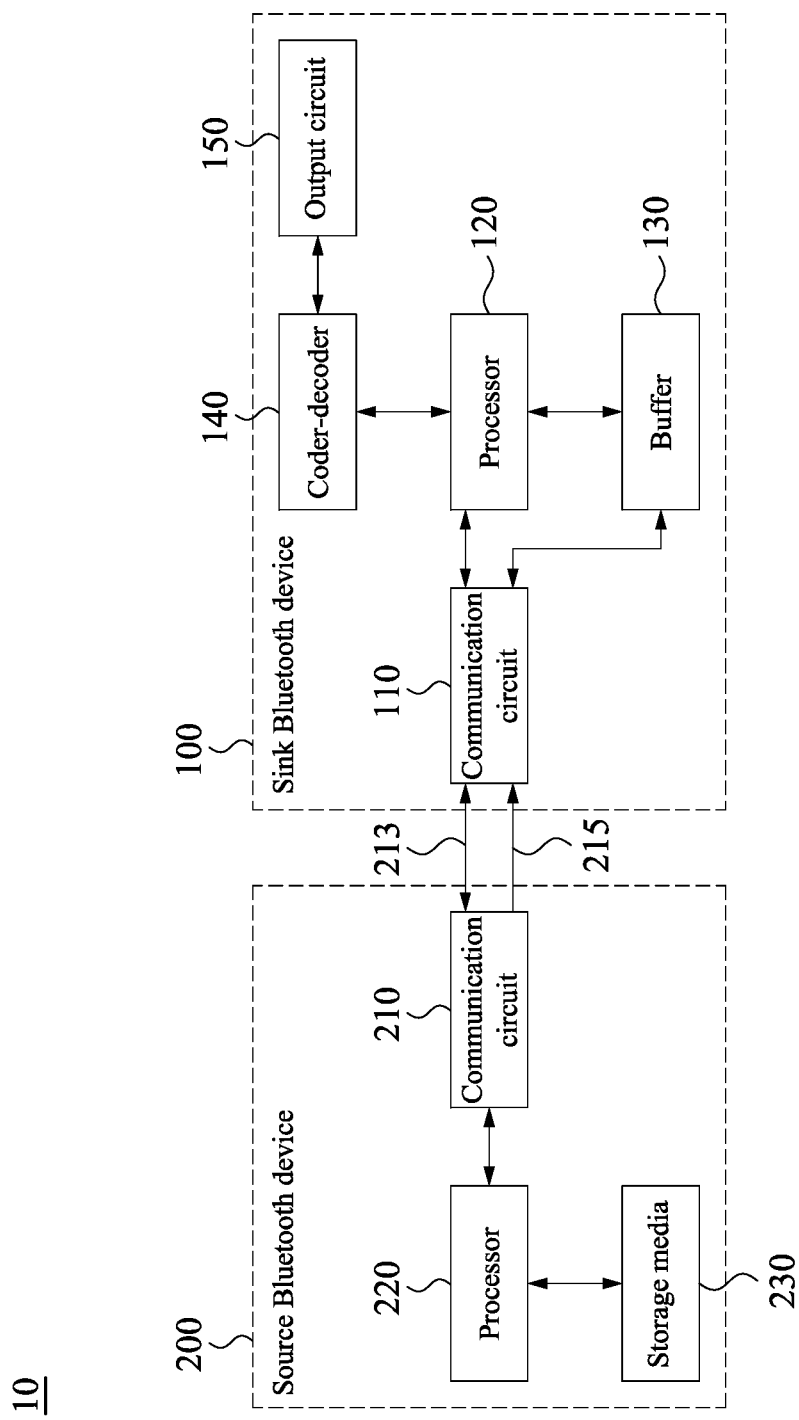
FIG. 1 is a block diagram illustrating an example of a Bluetooth communication system.

Reference is made to FIG. 1, which is a block diagram illustrating an example of a Bluetooth communication system 10. As shown in FIG. 1, the Bluetooth communication system 10 includes a sink Bluetooth device 100 and a source Bluetooth device 200. In some embodiments, the source Bluetooth device 200 is a master node or a source node, and the sink Bluetooth device 100 is a slave node or a sink node. In another embodiment, the Bluetooth communication system 10 also includes multiple master nodes and multiple slave nodes to construct a multiple-node network topology. The sink Bluetooth device 100 and the source Bluetooth device 200 are provided as an illustrative example. However, the present disclosure is not limited to the number of communication nodes.

The source Bluetooth device 200 includes a communication circuit 210, a processor 220 and a storage media 230. The processor 220 is coupled to the communication circuit 210 and the storage media 230. The storage media 230 is configured to store audio data, multimedia data, program instructions, and so on. In some embodiments, the source Bluetooth device 200 can be, but not limited to, mobile phones, computers, televisions, and so on.

The sink Bluetooth device 100 includes a communication circuit 110, a processor 120, a buffer 130, a coder-decoder 140 and an output circuit 150. The processor 120 is coupled to the communication circuit 110, the buffer 130 and the coder-decoder 140. In some embodiments, the sink Bluetooth device 100 can be, but not limited to, earphones, speakers, gaming controllers, and so on. The output circuit 150 is, for example, an audio playback circuit.

A control channel 213 and a data channel 215 are communicatively connected between the communication circuit 110 of the sink Bluetooth device 100 and the communication circuit 210 of the source Bluetooth device 200. The control channel 213 and the data channel 215 are configured to exchange data between the sink Bluetooth device 100 and the source Bluetooth device 200. In one embodiment, the sink Bluetooth device 100 receives, through the control channel 213, a setting data generated by the source Bluetooth device 200. In another embodiment, the sink Bluetooth device 100 receives, through the data channel 215, a data stream from the source Bluetooth device 200. The sink Bluetooth device 100 and the source Bluetooth device 200 execute data stream transmission/reception by implementing the Bluetooth Advanced Audio Distribution Profile (A2DP) of Bluetooth wireless communications. The operations between the sink Bluetooth device 100 and the source Bluetooth device 200 are described below.

One or more configuration modes can be chosen to be operated in an application stored in the source Bluetooth device 200. For example, multiple program instructions are stored in the storage media 230 of the source Bluetooth device 200. The processor 220 executes the instructions to provide the configuration modes for the source Bluetooth device 200. The configuration modes include a first mode which is configured to transmit the setting data to the sink Bluetooth device 100. In one embodiment, the first mode is the Bluetooth Low Energy (BLE) mode. The configuration modes further include a second mode which is configured to transmit the data stream to the sink Bluetooth device 100. In one embodiment, the second mode is the Basic Rate (BR) mode/Enhanced Data Rate (EDR) mode.

In the first mode (the BLE mode), the source Bluetooth device 200 transmits, through the control channel 213, the setting data to the sink Bluetooth device 100. In one embodiment, the source Bluetooth device 200 applies the Generic Attribute Profile (GATT) to transmit the setting data.

In the second mode (the BR/EDR mode), the source Bluetooth device 200 transmits, through the data channel 215, the data stream to the sink Bluetooth device 100. In one embodiment, the sink Bluetooth device 100 includes a storage media (not shown in FIG. 1). The storage media stores multiple codes which are relative to multiple functions. Subsequently, the sink Bluetooth device 100 can adjust, according to the codes received, the functions dynamically after acquiring the setting data from the codes. The detailed operations of adjustments are described below.

Figure 2:
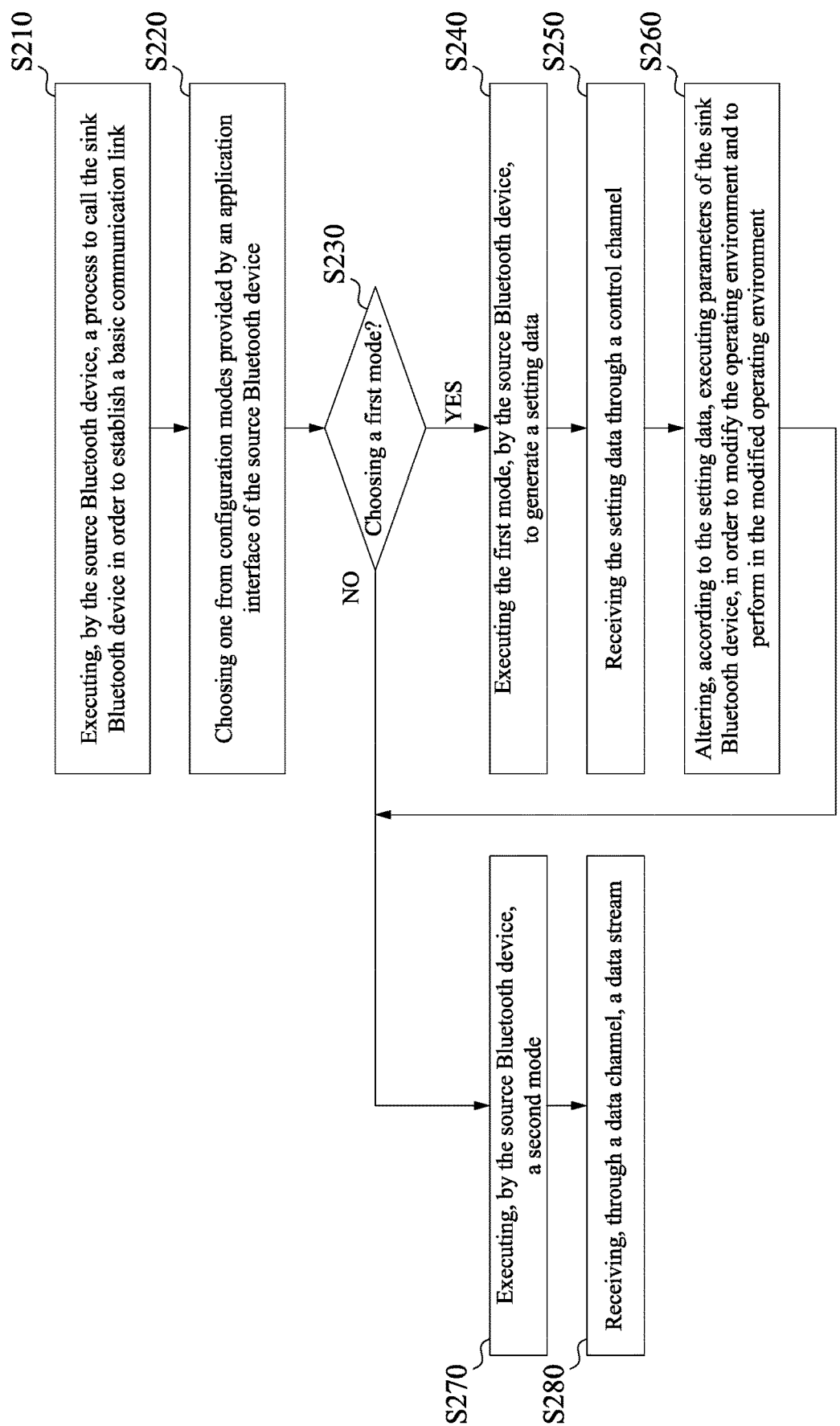
FIG. 2 is a flow chart illustrating an exemplary process for a method of operating Bluetooth devices.

Reference is now made to FIG. 2, which is a flow chart illustrating an exemplary process for a method of operating Bluetooth devices. In some embodiments, the Bluetooth devices are, for example, the sink Bluetooth device 100 and the source Bluetooth device 200.

In the operation S210, the source Bluetooth device 200 executes a calling process for the sink Bluetooth device 100 in order to establish a basic communication link. For example, the sink Bluetooth device 100 will be woken up from a standby state in order to establish a communication link according to a Bluetooth protocol.

In the operation S220, the application interface of the source Bluetooth device 200 provides the configuration modes, and one or more configuration modes can be chosen by a user such that the chosen configuration mode(s) will be implemented.

In the operation S230, a determination is made as to whether the first mode is chosen by the user. If the first mode is chosen, the operation S240 is processed.

In the operation S240, the source Bluetooth device 200 executes the first mode, and the application interface provides parameters of the sink Bluetooth device 100 for a user to determine which parameter is to be altered, in order to generate the setting data.

In the operation S250, the sink Bluetooth device 100 receives, through the control channel 213, the setting data which is configured to alter executing parameters of the sink Bluetooth device 100. An exemplary example of altering the executing parameters will be described with reference to FIG. 3.

In the operation S260, the executing parameters of the sink Bluetooth device 100 are altered according to the setting data in order that the operating environment is modified, and the communications between the sink Bluetooth device 100 and the source Bluetooth device 200 are performed in the modified operating environment.

Referring back to the operation S230, if the first mode is not chosen by the user, the operation S270 is performed. In the operation S270, the source Bluetooth device 200 executes the second mode.

In the operation S280, the sink Bluetooth device 100 receives, through the data channel 215, the data stream, and stores a data stream packet in the buffer 130.

Figure 3:
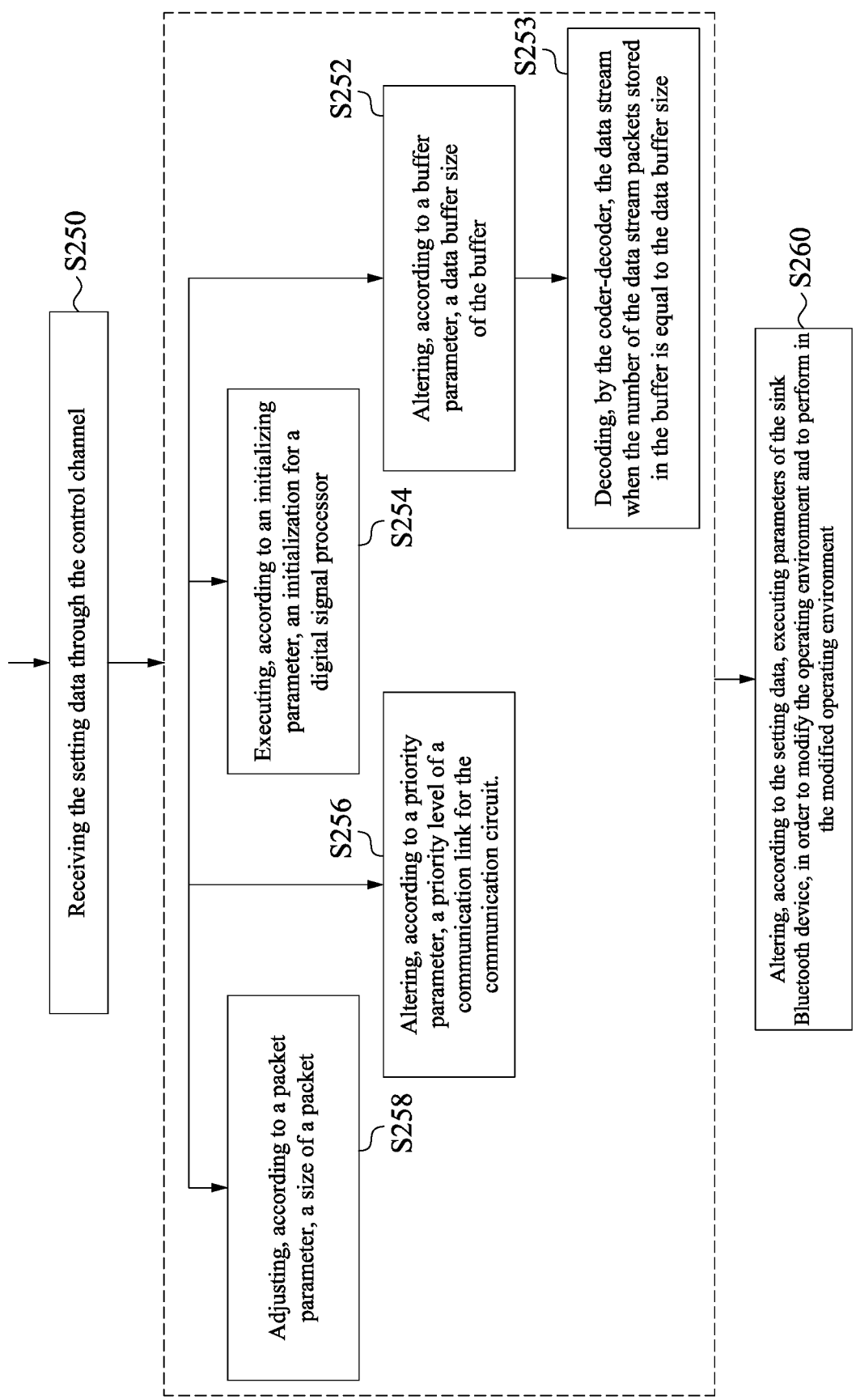
FIG. 3 is a flow chart illustrating an exemplary process for altering Bluetooth devices by a setting data.

Reference is now made to FIG. 3, which is a flow chart illustrating an exemplary process for altering the Bluetooth devices by the setting data. In the operation S250, the sink Bluetooth device 100 receives, through the control channel 213, the setting data, which has been described above.

In the operation S252, when the setting data is a buffer parameter, the sink Bluetooth device 100 alters a data buffer size of the buffer 130 according to the buffer parameter.

In the operation S253, if there are any data stream packets stored in the buffer 130, a determination is made as to whether a number of the data stream packets stored in the buffer 130 is equal to the data buffer size. When the number of the data stream packets stored in the buffer 130 is equal to the data buffer size, the coder-decoder 140 starts to decode the data stream. Accordingly, the output circuit 150 plays the multimedia data.

In the operation S253 and the operation S260, in one embodiment, when the data buffer size is 1, which indicates that the buffer 130 stores one data stream packet, the coder-decoder 140 starts to decode the data stream. A buffer module of the traditional Bluetooth device stores a sufficient number of packets before a CODEC module of the traditional Bluetooth device decodes the multimedia data. As a result, there exists a playback latency for the CODEC module of the traditional Bluetooth device to start decoding the multimedia data. Compared to the traditional Bluetooth device, the coder-decoder 140 of the present disclosure starts to decode the data stream in response to the buffer 130 storing one data stream packet, that is, the data buffer size is altered to be '1'. Accordingly, the audio playback latency can be reduced while the user watches videos.

In the operation S254, when the setting data is an initializing parameter for a digital signal processor (DSP), the processor 120 executes, according to the initializing parameter, an initialization process for the digital signal processor. In one embodiment, the buffer 130 starts to store the data stream in response to the processor 120 finishing the initialization process.

In the operation S254 and the operation S260, in one embodiment, because the sink Bluetooth device 100 executes the initialization process for the digital signal processor immediately, the coder-decoder 140 starts to decode the data stream in response to the buffer 130 storing the data stream packet. Accordingly, the playback latency can be reduced.

In the operation S256, when the setting data is a priority parameter for the communication circuit 110, the processor 120 alters, according to the priority parameter, a priority level of a communication link for the communication circuit 110. In one embodiment, the sink Bluetooth device 100 includes different types of communication circuits, such as the Bluetooth communication circuit, the Wi-Fi wireless communication circuit, the mobile communication circuit, and so on. Each of the wireless communication circuits can be set to corresponding priority levels of communication links. For example, if the priority parameter indicates that the Bluetooth communication circuit has a first connection priority, the sink Bluetooth device 100 makes the Bluetooth protocol be the first communication type to establish the connection.

In the operation S256 and the operation S260, in one embodiment, if the priority level of the Bluetooth communication circuit is altered to be the highest priority, the audio playback latency between the sink Bluetooth device 100 and the source Bluetooth device 200 can be reduced because the sink Bluetooth device 100 and the source Bluetooth device 200 will not attempt to establish other types of communication connections.

In the operation S258, when the setting data is a packet parameter, the processor 220 adjusts, according to the packet parameter, a size of a packet transmitted by the communication circuit 210.

In the operation S258 and the operation S260, in one embodiment, if the size of the packet to be transmitted is altered to be 2000 bytes, the communication circuit 210 encapsulates the data in the packet and sends the packet with a size of 2000 bytes faster than a packet with a size of, for example, 3000 bytes. Accordingly, the sink Bluetooth device 100 takes less time to de-encapsulate the packet. As a result, the sink Bluetooth device 100 can decode the data promptly so that the audio playback latency is reduced.

In one embodiment, the sink Bluetooth device 100 and the source Bluetooth device 200 both support dual working modes (such as the BLE mode and the ER/EDR mode). Programs are installed in the source Bluetooth device 200 such that the source Bluetooth device 200 switches the dual working modes automatically in order to change among the mode.

In some embodiments, a non-transitory computer readable storage medium storing instructions is provided. When the instructions are loaded into the sink Bluetooth device 100 and the source Bluetooth device 200 of the Bluetooth communication system 10 of FIG. 1, the processor 120 of the sink Bluetooth device 100 and the processor 220 of the source Bluetooth device 200 execute the operations S210~S280 of FIG. 2, the operation S250, the operations S252~S258 and operation S260 of FIG. 3, which are described above.

As described above, compared to simply implementing the Advanced Audio Distribution Profile (A2DP), the Bluetooth device and the method of operating the Bluetooth device in the present disclosure allow the user to choose, through the application interface of the source Bluetooth device 200, the configuration modes for operating the sink Bluetooth device 100. When the user wants to listen to music, he or she can tolerate an audio playback latency because the sink Bluetooth device 100 plays audios only. In this case, the sink Bluetooth device 100 can be set in the general Bluetooth transmission mode. On the other hand, when the user watches videos through a monitor and listens to audio through earphones or speakers via Bluetooth communication, or when the user plays games with a controller via Bluetooth communication, video/audio synchronization is required. Accordingly, the parameters (such as the buffer parameter, the initialization parameter and the priority parameter) of the sink Bluetooth device 100 are altered according to the method described above in order to reduce the audio playback latency while the video and the audio are played. By altering, depending on practical situations, the setting data of the sink Bluetooth device 100, the configuration modes can be adjusted dynamically and the audio playback latency can be controlled depending on different playback environments. The technical problem that the parameters of a traditional Bluetooth device cannot be adjusted in the prior art is solved. Accordingly, the present disclosure provides data transmission with a low audio playback latency and is suitable for playback environments associated with a low latency tolerance.

What is claimed is:

1. A Bluetooth device comprising:
   a communication circuit configured to receive a setting data through a control channel;
   a processor, coupled to the communication circuit, wherein the processor is configured to alter, by the setting data, at least one of executing parameters to modify operating environments, and the processor is further configured to perform operations of Bluetooth communications according to the operating environments which have been modified;
   a buffer;
   wherein when the processor alters the at least one of executing parameters by the setting data, the processor is further configured to execute, according to an initializing parameter of the setting data, an initialization process for a digital signal processor, and the buffer is configured to refrain from storing a data stream packet before the initialization process for the digital signal processor is finished.

2. The Bluetooth device of claim 1, wherein the buffer is coupled to the processor; and
   wherein the processor, which is configured to alter the at least one of executing parameters by the setting data, is further configured to alter, according to a buffer parameter of the setting data, a data buffer size of the buffer.

3. The Bluetooth device of claim 2, wherein when the processor performs the operations of the Bluetooth communications according to the operating environments which have been modified, the communication circuit is further configured to receive the data stream packet through a data channel, wherein the data stream packet is stored in the buffer.

4. The Bluetooth device of claim 3, further comprising a coder-decoder coupled to the processor;
   wherein the processor controls the coder-decoder to decode the data stream packet in response to the processor determining that a number of the data stream packet stored in the buffer is equal to the data buffer size.

5. The Bluetooth device of claim 4, further comprising an output circuit coupled to the coder-decoder, wherein the output circuit is configured to play the data stream decoded by the coder-decoder.

6. The Bluetooth device of claim 1, wherein the processor, which is configured to alter the at least one of executing parameters by the setting data, is further configured to alter, according to a priority parameter of the setting data, a priority level of a communication link of the communication circuit.

7. The Bluetooth device of claim 1, wherein the processor, which is configured to alter the at least one of executing parameters by the setting data, is further configured to adjust, according to a packet parameter of setting data, a size of packets to be received by a data channel of the communication circuit.

8. The Bluetooth device of claim 1, wherein the control channel comprises a Bluetooth low energy channel.

9. The Bluetooth device of claim 1, wherein a plurality of parameters are provided through an application interface, and the processor is further configured to generate the setting data according to at least one of the plurality of parameters.

10. A method of operating a Bluetooth device, wherein the Bluetooth device comprises a communication circuit, a buffer and a processor coupled to the communication circuit, and the method comprises:

receiving, through a control channel of the communication circuit, a setting data;
altering, by the processor, at least one of executing parameters by the setting data to modify operating environments, wherein the step of altering the at least one of executing parameters comprises:
executing, according to an initializing parameter of the setting data, an initialization process for a digital signal processor; and
storing a data stream packet in the buffer after finishing the initialization process for the digital signal processor; and
performing, by the processor, operations of Bluetooth communications according to operating environments modified by the at least one of executing parameters which have been altered.

11. The method of claim 10, wherein the step of altering the at least one of executing parameters by the setting data comprises:
altering, according to a buffer parameter of the setting data, a data buffer size of the buffer.

12. The method of claim 11, wherein the step of performing, according to the operating environments modified by the at least one of executing parameters which have been altered, the operations of the Bluetooth communications comprises:
receiving, through a data channel of the communication circuit, the data stream packet, wherein the data stream packet is stored in the buffer.

13. The method of claim 12, wherein the Bluetooth device further comprises a coder-decoder, and the method further comprises:
controlling the coder-decoder to decode the data stream packet in response to determining that a number of the data stream packet stored in the buffer is equal to the data buffer size.

14. The method of claim 13, further comprising:
playing, by an output circuit, the data stream packet decoded by the coder-decoder.

15. The method of claim 10, wherein the step of altering the at least one of executing parameters by the setting data comprises:
altering, according to a priority parameter of the setting data, a priority level of a communication link of the communication circuit.

16. The method of claim 10, wherein the step of altering the at least one of executing parameters by the setting data comprises:
adjusting, according to a packet parameter of setting data, a size of packet to be received by a data channel of the communication circuit.

17. The method of claim 10, further comprising:
providing, through an application interface, a plurality of parameters; and
generating the setting data according to at least one of the plurality of parameters.

18. A non-transitory computer readable storage medium storing computer executable codes comprising instructions for causing a processor to:
receive, through a control channel of a communication circuit, a setting data;
alter at least one of executing parameters by the setting data, wherein the step of to alter the at least one of executing parameters comprises:
executing, according to an initializing parameter of the setting data, an initialization process for a digital signal processor; and
storing a data stream packet in a buffer after finishing the initialization process for the digital signal processor; and
perform, according to operating environments modified by the at least one of executing parameters which have been altered, operations of Bluetooth communications.

* * * * *